United States Patent
Adra et al.

(10) Patent No.: US 11,705,768 B2
(45) Date of Patent: Jul. 18, 2023

(54) TWISTED COIL STRUCTURES FOR AN ELECTRIC MOTOR AND SYSTEMS, COMPONENTS, ASSEMBLIES, AND METHODS THEREOF

(71) Applicant: Caterpillar Inc., Peoria, IL (US)

(72) Inventors: Rodwan T. Adra, Peoria, IL (US); Brian R. Janes, Chillicothe, IL (US); Andrew Friebohle, East Peoria, IL (US); Edwin B. Schultz, Pekin, IL (US)

(73) Assignee: Caterpillar Inc., Peoria, IL (US)

( * ) Notice: Subject to any disclaimer, the term of this patent is extended or adjusted under 35 U.S.C. 154(b) by 101 days.

(21) Appl. No.: 17/322,899

(22) Filed: May 18, 2021

(65) Prior Publication Data

US 2022/0376574 A1 Nov. 24, 2022

(51) Int. Cl.
*H02K 3/12* (2006.01)
*H02K 19/10* (2006.01)
*H02K 3/48* (2006.01)
*H02K 1/16* (2006.01)

(52) U.S. Cl.
CPC ................ *H02K 3/12* (2013.01); *H02K 1/16* (2013.01); *H02K 3/48* (2013.01); *H02K 19/103* (2013.01)

(58) Field of Classification Search
CPC .. H02K 1/12; H02K 1/16; H02K 3/12; H02K 3/48; H02K 3/487; H02K 19/10; H02K 19/107
USPC .......................... 310/179, 180, 181, 184, 208
See application file for complete search history.

(56) References Cited

U.S. PATENT DOCUMENTS

| | | | |
|---|---|---|---|
| 2,437,142 A | 3/1948 | Welch et al. | |
| 4,746,075 A | 5/1988 | Hoxit | |
| 7,868,726 B2 | 1/2011 | Asano | |
| 9,118,225 B2 | 8/2015 | Adra | |
| 9,742,231 B2 | 8/2017 | Dunesme et al. | |
| 10,128,706 B2 | 11/2018 | Adra | |
| 2014/0055000 A1* | 2/2014 | Adra | H02K 3/14 310/213 |
| 2015/0025704 A1* | 1/2015 | Horihata | H04L 12/40039 700/297 |
| 2017/0155295 A1* | 6/2017 | Adra | H02K 3/18 |
| 2017/0179782 A1* | 6/2017 | Ito | H02K 15/066 |
| 2018/0006592 A1 | 1/2018 | Faid et al. | |
| 2022/0329116 A1* | 10/2022 | Neet | H02K 3/28 |

FOREIGN PATENT DOCUMENTS

CN 207097483 U 3/2018
EP 1930918 A2 6/2008

OTHER PUBLICATIONS

Written Opinion and International Search Report for Int'l. Patent Appln. No PCT/US2022/27780, dated Aug. 17, 2022 (8 pgs).

* cited by examiner

*Primary Examiner* — Rashad H Johnson
(74) *Attorney, Agent, or Firm* — Xsensus LLC

(57) ABSTRACT

A coil winding for an electric motor, and systems, components, assemblies, and methods thereof, can comprise turns of a predetermined number of electrically conductive wires on a first side of the coil winding twisted together in a clockwise direction; and turns of the predetermined number of the electrically conductive wires on a second side of the coil winding opposite the first side twisted together in a counterclockwise direction.

20 Claims, 6 Drawing Sheets

US 11,705,768 B2

TWISTED COIL STRUCTURES FOR AN ELECTRIC MOTOR AND SYSTEMS, COMPONENTS, ASSEMBLIES, AND METHODS THEREOF

TECHNICAL FIELD

The present disclosure relates to electric motors, and more particularly to twisted coil structures for electric motors, and systems, components, assemblies, and methods thereof.

BACKGROUND

Work machines may be powered by electrical propulsion systems. The electrical propulsion systems may sometimes include electric drive traction systems that provide driving forces to traction devices of the work machines. In some electric drive fraction systems, switched reluctance motors can be used to provide the driving force.

Switched reluctance motors may have various motor topologies (e.g., the number of stator poles, the number of coils, and the number of rotor poles). In addition, a switched reluctance motor may be configured with a plurality of phases (e.g., 2 phases, 3 phases, 4 phases, or more). A switched reluctance motor may have a plurality of stator poles, each with a winding of electrically conductive wires or coil positioned thereabout. The number of wires and the configuration of the coil is one factor that can affect the efficiency of the operation of the switched reluctance motor.

Many switched reluctance motors are designed to optimize operation under certain operating conditions. However, it may be desirable for switched reluctance motors used to power certain work machines to operate efficiently at both low speeds with high current and at higher speeds with lower current. The coils of some motors perform well electrically but may lack the ability to carry significant amounts of current without excessive coil heating. Other coils may have increased current carrying capacity but may not perform efficiently as operating frequencies increase, which also limits their ability to power work machines.

U.S. Pat. No. 10,128,706 ("the '706 patent") describes a rotary electric machine that includes a stator having an open slot configuration and a plurality of stator poles with a coil positioned about each stator pole. The '706 patent also describes that each coil has a plurality of electrically conductive wires defining a group of wires and the group of wires is wrapped generally around a stator to define a plurality of turns. According to the '706 patent, at least a portion of the group of wires is twisted, and the portion of the group of the wires has between approximately 1 and 5 twists per turn.

SUMMARY

According to an aspect a coil winding for an electric motor is disclosed or provided. The coil winding can comprise turns of a predetermined number of electrically conductive wires on a first side of the coil winding twisted together in a clockwise direction; and turns of the predetermined number of the electrically conductive wires on a second side of the coil winding opposite the first side twisted together in a counterclockwise direction.

In another aspect, an electric motor is disclosed or provided. The electric motor can comprise: a stator; a rotor positioned relative to the stator; and a plurality of coils respectively arranged around stator poles of the stator. Each said coil can be comprised of a plurality of electrically conductive wires wound continuously to form a predetermined geometrical shape, and for at least one of the coils: turns of the electrically conductive wires on a first side of the predetermined geometric shape are twisted together in a first direction, and turns of the electrically conductive wires on a second side of the predetermined geometric shape opposite the first side are twisted together in a second direction opposite the first direction.

And in another aspect a switched reluctance motor is disclosed or provided. The switched reluctance motor can comprise: a stator including a plurality of stator poles and a plurality of stator slots, each said stator slot being positioned between a pair of the plurality of stator poles; a rotor positioned within the stator; and a plurality of coils, each said coil being positioned around a corresponding one of the stator poles. Each said coil can be comprised of a plurality of electrically conductive wires and forms an elongate ring with a pair of opposing long sides and opposing short sides connecting the long sides, wherein, for each said coil, the electrically conductive wires can be arranged in a plurality of groups, wherein, for each of the groups, the electrically conductive wires on a first long side of the pair of opposing long sides can be twisted together in a clockwise twisting direction, as viewed from one of the short sides, continuously along an entire length of the first long side, and wherein, for each of the groups, the electrically conductive wires on a second long side of the pair of opposing long sides can be twisted together in a counterclockwise twisting direction, as viewed from said one of the short sides, continuously along an entire length of the second long side.

Other features and aspects of this disclosure will be apparent from the following description and the accompanying drawings.

DETAILED DESCRIPTION

The present disclosure relates to twisted coil structures for electric motors, and systems, components, assemblies, and methods thereof.

Figure 1:
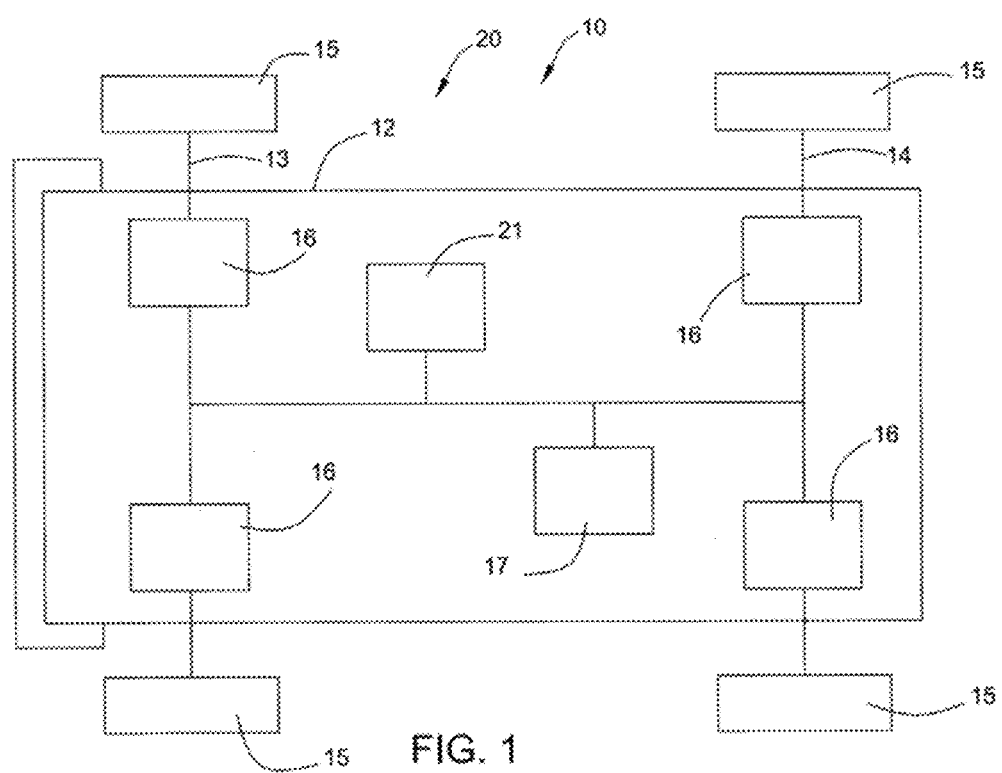
FIG. 1 is a diagrammatic view of a work machine incorporating certain aspects of the disclosure herein.

Referring to FIG. 1, a machine 10 is schematically depicted including a chassis 12 with a front axle 13 and a rear axle 14. A traction device 15 (e.g., wheels, tracks, etc.) may be mounted on each end of each axle and may be driven by a switched reluctance traction system 16, as an example. A power source 17 can provide electrical power to the switched reluctance traction systems 16. Power source 17 may use a prime mover (not shown) such as an internal combustion engine coupled with a generator (not shown) to supply electrical power to the switched reluctance fraction systems 16. In another embodiment, power source 17 may be a fuel cell generator (not shown) configured to supply electrical power directly to the switched reluctance traction systems 16. Still further, power source 17 may include a hybrid system including two or more different types of devices to convert an energy supply to electrical energy or for directly supplying electrical energy.

A controller 21 may be used to control operation of the switched reluctance traction systems 16 as well as the power source 17 and other components and systems of the machine 10. Controller 21 may be a component of a control system shown generally at 20 in FIG. 1 to indicate association with machine 10. Control system 20 may include one or more sensors to provide data and other input signals representative of various operating parameters of the machine 10.

The controller 21 may be an electronic controller that operates in a logical fashion to perform operations, execute control algorithms, store and retrieve data and other desired operations. The controller 21 may include or access memory, secondary storage devices, processors, and any other components for running an application. The memory and secondary storage devices may be in the form of read-only memory (ROM) or random access memory (RAM) or integrated circuitry that is accessible by the controller. Various other circuits may be associated with the controller such as power supply circuitry, signal conditioning circuitry, driver circuitry, and other types of circuitry.

The controller 21 may be a single controller or may include more than one controller disposed to control various functions and/or features of the machine 10. The term "controller" is meant to be used in its broadest sense to include one or more controllers and/or microprocessors that may be associated with the machine 10 and that may cooperate in controlling various functions and operations of the machine. The functionality of the controller 21 may be implemented in hardware and/or software without regard to the functionality. The controller 21 may control the switched reluctance traction systems 16 and other functions of the machine 10. Though switched reluctance traction systems are described, embodiments of the disclosed subject matter are not so limited and may include other types of electric motor-based traction systems.

Figure 2:
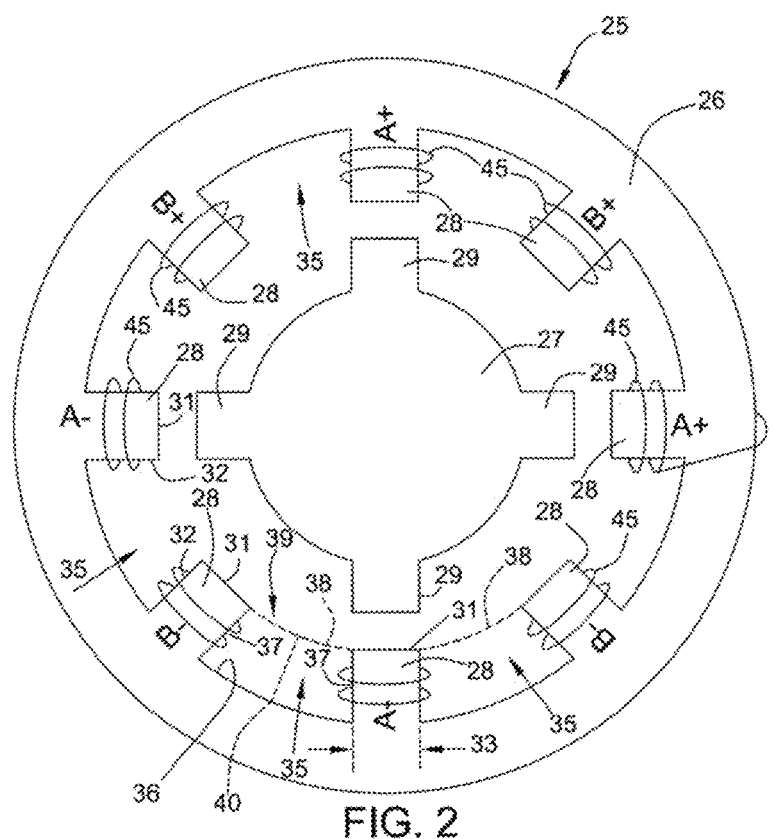
FIG. 2 is a diagrammatic top view of a portion of a switched reluctance motor incorporating certain aspects of the disclosure herein.

FIG. 2 depicts a schematic view of a rotary electric machine 25 according to one or more embodiments of the disclosed subject matter. The rotary electric machine 25 may be a switched reluctance motor that may be associated with each switched reluctance traction system 16, though embodiments of the disclosed subject matter are not limited to switched reluctance motors and may include other types of electric motors with coil windings (e.g., induction motors, etc.). As depicted in FIG. 2, the rotary electric machine may be in the form of an 8/4 2-phase switched reluctance motor (i.e., eight stator poles 28, four rotor poles 29, and 2-phase conduction) that can include a stator 26 and a rotor 27 rotatable relative to the stator. The number of phases as well as the number of stator poles 28 and rotor poles 29 is exemplary only and not intended to be limiting. In other words, the rotary electric machine 25 in the form of the switched reluctance motor may have a first plurality of stator poles 28 and a second plurality of rotor poles 29.

As depicted, stator 26 can include eight radially inwardly projecting stator poles 28 and rotor 27 can include four radially outwardly projecting rotor poles 29. Each stator pole 28 can project radially inward and can have an inward end face 31 and a pair of oppositely facing side surfaces 32. The distance, indicated at 33, between the oppositely facing side surfaces 32 (i.e., a first side surface and a second side surface of the stator pole 28) can be generally constant so that each pole has a generally constant width in a circumferential direction around the stator 26.

Figure 6:
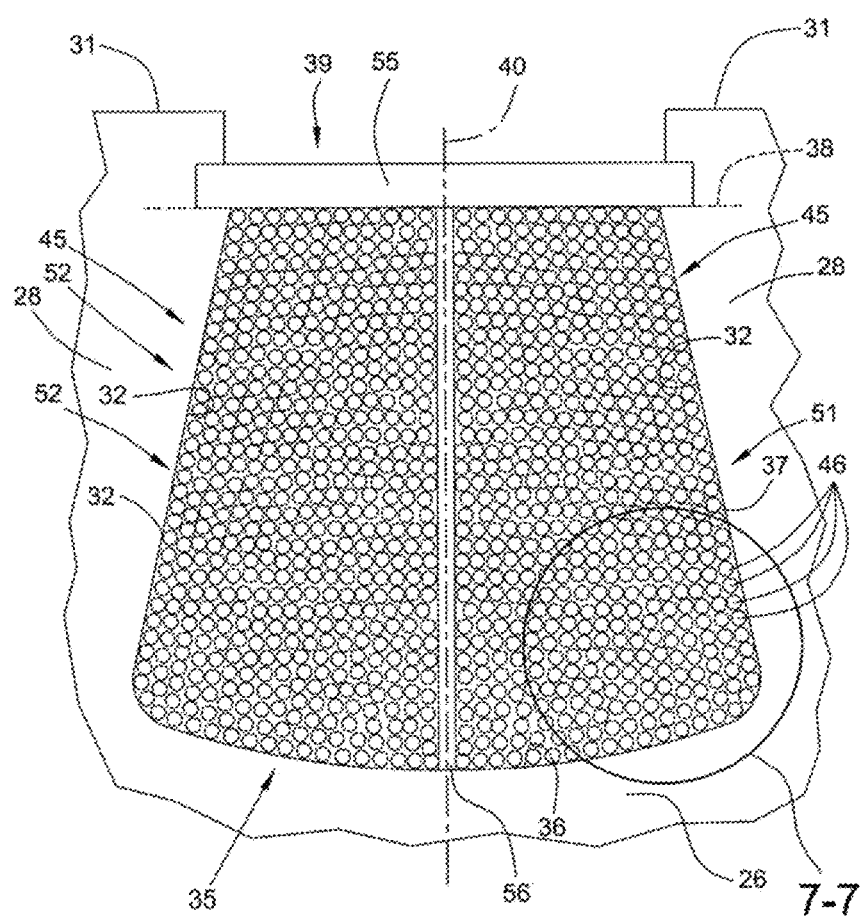
FIG. 6 is a section taken generally along line 6-6 of FIG. 5.

Stator 26 can further include a plurality of stator slots 35 with each stator slot being angularly positioned between a pair of the stator poles 28 and thus each stator pole 28 can be angularly positioned between a pair of adjacent stator slots 35. Accordingly, the number of stator slots 35 may be equal in number to the number of stator poles 28. Each stator slot 35 can open towards rotor 27 and can have an edge or outer surface 36, opposed side edges 37 defined by the oppositely facing side surfaces 32 of adjacent stator poles 28, and an inner boundary 38 extending generally along or across the opening 39 of the stator slot 35. As described below, a retention structure 55 may span the opposed side edges 37 across the opening 39 to retain coils 45 positioned on each stator pole 28 within the stator slots 35. Accordingly, the inner boundary 38 of each stator slot 35 may be spaced from the inward end face 31 of each stator pole 28 as best seen in FIG. 6.

Due to the circular cross-section of the stator 26 and the generally constant width of each stator pole 28 in an arcuate or circumferential direction, each stator slot 35 can have a width that tapers or narrows generally uniformly or linearly from the outer surface 36 towards the opening 39. With such a structure, the stator 26 may be referred to as having an open slot configuration. A centerline 40 of each stator slot 35 can extend between adjacent pairs of stator poles to extend generally along the midpoint between the opposed side edges 37 of the stator slot 35.

The stator poles 28 may be grouped in two or more stator pole 28 sets that correspond to the number of phases (e.g., 2) of the rotary electric machine 25 in the form of the switched reluctance motor. In the depicted example, the eight stator poles 28 are grouped in two phase sets with four stator poles 28 (depicted as A+ and A−) grouped into one phase set and four stator poles 28 (depicted as B+ and B−) grouped into the other phase set. The rotor poles 29 may be grouped in diametrically aligned pairs.

Figure 3:
FIG. 3 is a simplified schematic view of a portion of an electrical circuit including coils of the switched reluctance motor of FIG. 2.

Each stator pole 28 can have a conductive winding or coil 45 wrapped therearound. The coils 45 can be positioned about the stator poles 28 of each group of a phase set (A+, A− and B+, B−) and electrically connected and may be configured as part of an electrical circuit, either in parallel or in series. FIG. 3 depicts the coils 45 of phase A connected in parallel. The coils 45 of phase B may be arranged in a manner similar to the coils 45 of FIG. 3.

Switched reluctance motor 25 can have a rotor 27 with no windings or magnets. The rotor 27 may be formed of a stack of vertically laminated iron, one-piece continuous annular members, for instance. Rotors having other structures and configurations are contemplated, however. In addition, while the rotary electric machine 25, i.e., electric motor, of FIG. 2 is depicted as a switched reluctance motor, the concepts disclosed herein can be applicable to other rotary electric machines such as a switched reluctance generator or another type of electric motor or generator. The concepts are further applicable to other rotary electric machines, for example, one in which the rotor 27 has permanent magnets or some other structure or configuration.

In operation, rotation of the rotor 27 of the rotary electric machine 25 in the form of the switched reluctance motor can be achieved by the sequential excitation or energization of adjacent sets of stator poles 28 by supplying DC current to the coils 45 of the stator poles 28. Energization of the stator poles 28 can create magnetic flux towards which the rotor poles 29 are attracted which tends to align the rotor poles 29 with the energized stator poles 28. As the rotor poles 29 become aligned with the energized stator poles 28, the DC current to the energized poles can be terminated and subsequently supplied to the next sequential stator poles 28. The rotor poles 29 can then be attracted to the next set of sequential poles, which can cause continued rotation of the rotor 27. This process can be continued during operation of the rotary electric machine 25 in the form of the switched reluctance motor. Torque can be generated by the tendency of rotor poles 29 to align with energized stator poles 28. Continuous torque may be generated by synchronizing excitation of consecutive stator poles 28 with the instantaneous position of rotor poles 29.

Figure 4:
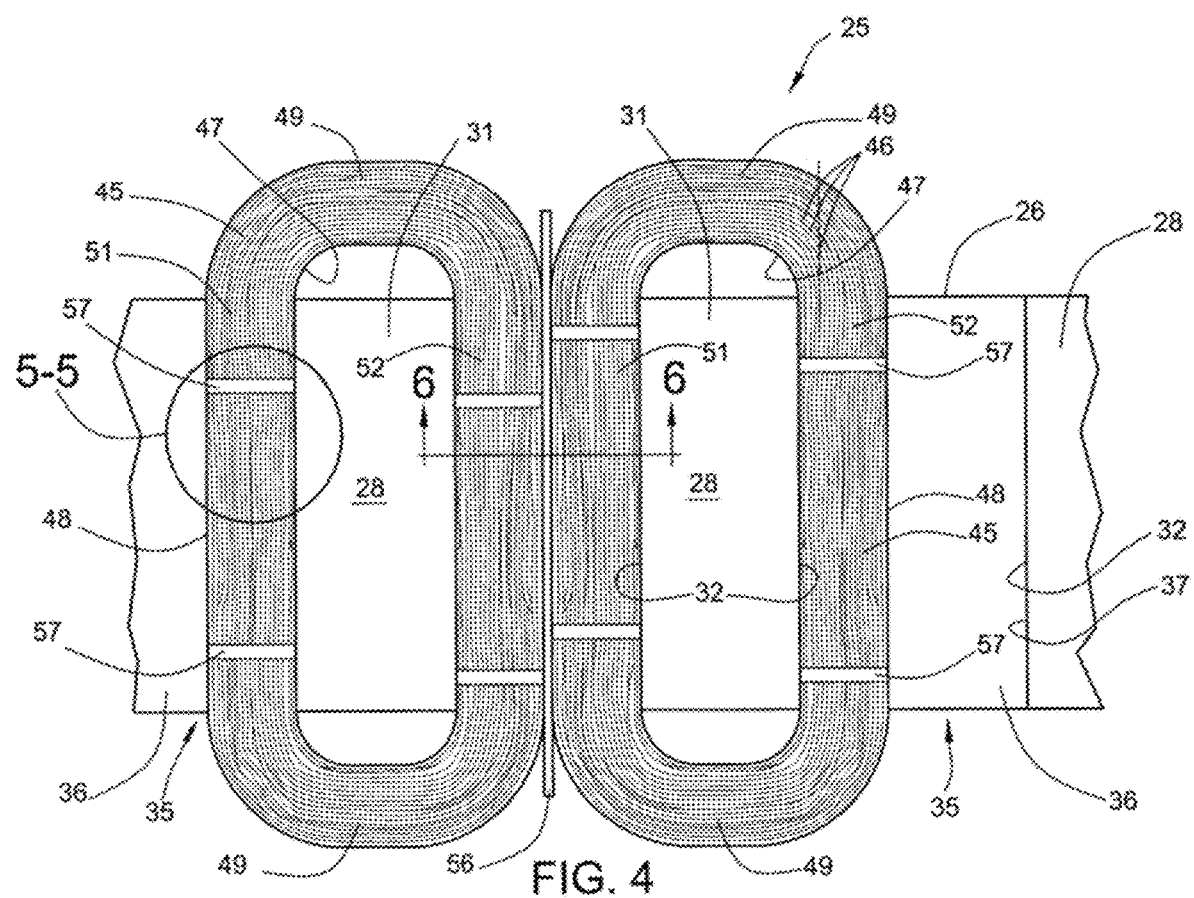
FIG. 4 is an end view of a portion of a stator assembly taken from the perspective of the rotor within the stator with certain components removed for clarity, according to one or more embodiments of the present disclosure.
Figure 5:
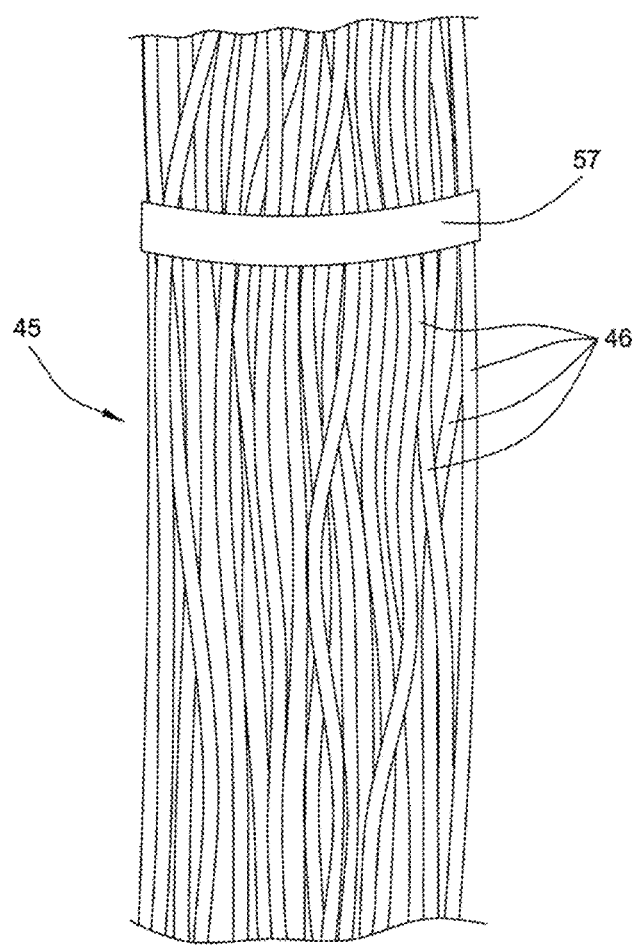
FIG. 5 is an enlarged view of the circled portion 5-5 of one of the coils in FIG. 4.

Referring to FIG. 4, a portion of the stator 26 is depicted with two coils 45 positioned about adjacent stator poles 28. Each coil 45 may be formed of a plurality of electrically conductive wires 46 that define a group of wires that are wound continuously around a central opening 47 a predetermined number of times or turns to form a predetermined geometrical shape, for instance, a ring shape (e.g., elongate ring, oval, rectangular oval, square, etc.). According to one or more embodiments, each coil 45 may be generally identical and configured according to embodiments of the disclosed subject matter. Alternatively, at least or one or more of the coils 45 can be configured according to embodiments of the disclosed subject matter.

The central opening 47, which can define a center void or open volume, can generally correspond in size at least to the cross section of the stator poles 28 so that the coil 45 may be slid onto the stator pole 28 during the fabrication of the rotary electric machine 25 in the form of the switched reluctance motor 25. According to one or more embodiments, each coil 45 can have a pair of long or major sides 48 and a pair of short or minor sides 49 interconnecting the pair of long sides 48. The pair of long sides 48 may be referred to herein as first and second long sides 48, respectively. Accordingly, each coil 45 can have a first portion 51 that extends through a first stator slot 35 and a second portion 52 that extends through a second stator slot 35. The second stator slot 35 can be adjacent the first stator slot 35 with the first and second stator slots 35 separated by a stator pole 28. Moreover, the first portion 51 of one coil 45 and the second portion 52 of another, adjacent coil 45 can be provided in a same stator slot 35, between adjacent stator poles 28, such as shown in FIG. 4.

The coil 45 may be formed of a plurality of electrically conductive wires 46, as noted above, each having a generally circular cross-section, for instance. Alternatively, the electrically conductive wires 46 may have a non-circular cross-section such as oval, square, or rectangular in some configurations. The electrically conductive wires 46 may be formed of a highly conductive, flexible material, such as copper, and may have a layer of insulation thereon. In one embodiment, magnet wires having a layer of enamel insulation may be used. As an example, each electrically conductive wire 46 may have a diameter of approximately 0.05 inches. The electrically conductive wires 46, however, may also have other diameters. In another embodiment, the electrically conductive wires 46 may be approximately 15-18 gauge wire.

The electrically conductive wires 46 may grouped and then wound to form the coil 45. The group of electrically conductive wires 46 according to embodiments of the disclosed subject matter may be in a range from two to thirty (inclusive) strands of the electrically conductive wires 46, for instance. Additionally, the electrically conductive wires 46 may be wrapped a predetermined number of revolutions, i.e., turns around the central opening 47, to form the coil 45. According to embodiments of the disclosed subject matter, the number of turns can be in a range from ten to one hundred turns (inclusive). The number of turns or times that the group of electrically conductive wires 46 is wrapped around the central opening 47 may be determined or set based upon the desired electrical performance of the rotary electric machine 25 in the form of the switched reluctance motor. Accordingly, the number of turns about the central opening 47 may be adjusted as desired. According to one or more embodiments, each coil 45 may be set or fixed in its wound shape using a bonding resin or the like (e.g., a cured epoxy resin).

The group of electrically conductive wires 46 wrapped around the central core 47 may also be twisted together. The twisting of the electrically conductive wires 46 may be achieved in a variety of manners. In one example, the electrically conductive wires 46 may be twisted as they are being fed and wrapped around a rotating fixture (e.g., a bobbin) to form the coil 45. According to one or more embodiments, the twisting together of the electrically conductive wires 46 of the group may not be considered or characterized as braiding.

The twisting of the group of electrically conductive wires 46 may be according to a predetermined pattern. Notably, according to embodiments of the disclosed subject matter, the twisting may be done in opposite directions. In particular, according to embodiments of the disclosed subject matter, the grouped electrically conductive wires 46 may be twisted in a first direction for one or more portions or segments of a turn (in this context a single revolution) around the coil 45 and in a second direction opposite the first direction for one or more portions or segments of the turn around the coil 45. Such first and second directions may be referred to herein as clockwise and counterclockwise or vice versa, respectively.

In some embodiments, the grouped electrically conductive wires 46 either may not be twisted for one or more portions or segments of the turn around the coil 45 (this may be referred to as neutral or untwisted positioning) or may be twisted by an amount less than (i.e., between) the amounts of twist for first and second directions for so-called twisted portions or segments around the coil 45. For instance, clockwise and counterclockwise twisting may be characterized as a twist of +/−360 degrees or more (e.g., +/−720 degrees or +/−900 degrees) from a neutral or zero position, that is, one twisting revolution, two twisting revolutions, or 2.5 twisting revolutions. Hence, untwisted may be characterized as at the neutral or zero degrees position for the electrically conductive wires 46 of the group or even between positive three hundred sixty degrees and negative three hundred sixty degrees, such as positive five degrees. In that the electrically conductive wires 46 of the group can be twisted together at least one full twist revolution, i.e., three hundred sixty degrees or more (e.g., 360 degrees to 900 degrees), each electrically conductive wire 46 can have at least one portion or segment along the turn that is closer to the central opening 47 (and the center void) than corresponding portions or segments of the other electrically conductive wires 46 of the group and at least one portion or segment along the turn that is farther from the central opening 47 (and the center void) than corresponding portions or segments of the other electrically conductive wires 46 of the twisted group.

As noted above, the twisting can be to one or more portions or segments of the turn. For instance, according to one or more embodiments, the segment of the electrically conductive wires 46 at one of the long side 48, for instance, associated with the first portion 51 of the coil 45, can have electrically conductive wires 46 of the group that are twisted together in a clockwise twisting direction, whereas the segment of the electrically conductive wires 46 at the other long side 48, for instance, associated with the second portion 52 of the coil 45, can have electrically conductive wires 46 of the group that are twisted together in a counterclockwise direction. The segments at the short sides 49 may be either untwisted or twisted together in a same twisting direction as an immediately preceding long side 48. In this example, the twisting together for the long sides 48 can be continuous along an entire length or an entirety of the long sides 48. Thus, the twisting together of the electrically conductive wires 46 of the group along each of the long sides 48 can be considered or characterized as being continuously twisted together without any untwisted portion(s) along the entire long side 48. The number of twists for the long sides 48 can be the same according to embodiments of the disclosed subject matter. Optionally, the twisting together of the electrically conductive wires 46 at the short sides 49 can be less than the twisting together of the electrically conductive wires 46 for the long sides 48. That is, the twisting together of the electrically conductive wires 46 at the short sides 49 can be less tight than the twisting together of the electrically conductive wires 46 for the long sides 48.

Figure 7:
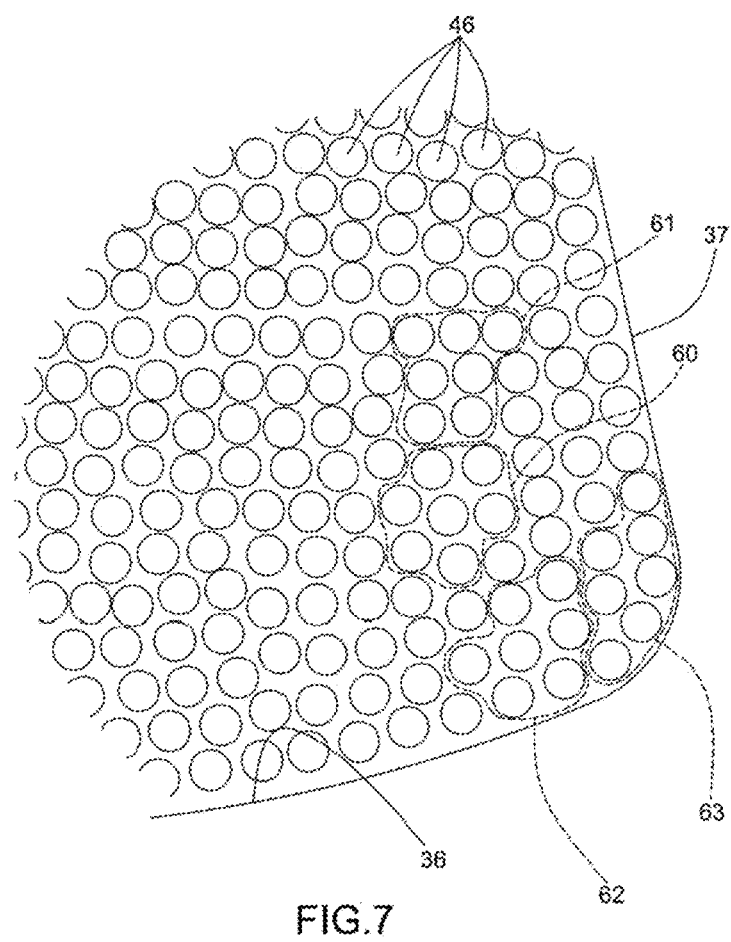
FIG. 7 is an enlarged view of the circled portion 7-7 of a portion of a coil in FIG. 6.

According to one or more embodiments, the twisting together of the electrically conductive wires 46 per portion or segment may be the same or substantially the same (e.g., same amount of twisting) in a thickness direction or at a same level of the coil 45 for the different turns of the group of electrically conductive wires 46 generally at the same level (i.e., into the page direction in FIG. 4; horizontal direction in FIG. 7, where first turn 63 and second turn 62 of the group of electrically conductive wires 46 may be considered to be at a same level of buildup of the coil 45). However, the twisting together (or not) of the group of electrically conductive wires 46 may change in a height direction of the coil 45 (i.e., horizontal direction in FIG. 4; vertical direction in FIG. 7, where third turn 60 may be considered to be at a height or level above second turn 62 of the group of electrically conductive wires 46 in the buildup of the coil 45). For instance, the twisting together amount for the electrically conductive wires 46 may increase as the turns increase and the buildup of the coil 45 grows. That is, at greater heights or levels the electrically conductive wires 46 may be twisted together more than at the turns of the electrically conductive wires 46 closer to the central opening 47. Optionally, no twisting may occur for turns at the interface with the central opening 47. The height direction or levels of the coil 45 may be referred to herein as a direction away from the central opening (and the center void).

Regardless of the manner of twisting the electrically conductive wires 46, each twist can form a relatively loose twist of the electrically conductive wires 46. Such twisting of electrically conductive wires 46 may permit the individual electrically conductive wires 46 to move laterally relative to the other wires of the group as the coil 45 is being mounted on a stator pole 28. In the example described above, the group of electrically conductive wires 46 may be twisted approximately two times as they travel about the central opening 47. As the electrically conductive wires 46 are twisted, the group of electrically conductive wires 46 may take on a somewhat circular cross-section. However, the relatively loose twist of the electrically conductive wires 46 may permit some lateral movement of each electrically conductive wire 46 relative to other wires within the group of electrically conductive wires 46. Once the coil 45 is mounted on the stator pole 28, the electrically conductive wires 46 may have moved laterally sufficiently so that each turn or wrap of the group of electrically conductive wires 46 may not be readily discernible from other turns or wraps of the electrically conductive wires 46 and the individual electrically conductive wires 46 may appear to be relatively randomly positioned or positioned in a non-uniform array within each stator slot 35. Although the group of wires in the depicted embodiment can be twisted twice for each wrap around the central opening 47, in other embodiments the electrically conductive wires 46 may be twisted between approximately one and five times per turn or 0.5 to 2.5 twists per side as they are wrapped about the central opening 47 (again, for some or all portions or portions of the turn), though embodiments of the disclosed subject matter are not so limited.

FIG. 6 depicts a cross-section through one of the stator slots 35 and a pair of adjacent stator poles 28 having coils 45 positioned therearound. The first portion 51 of one coil 45 and the second portion 52 of a second, adjacent coil 45 can each be positioned within the stator slot 35. A non-conductive spacer 56 may be positioned generally along the centerline 40 of each stator slot 35 to separate the first portion 51 of one coil 45 from the second portion 52 of the second, adjacent coil 45. Because the electrically conductive wires 46 can be relatively loosely twisted when forming the group of electrically conductive wires 46, they may be laterally movable relative to other of the electrically conductive wires 46 within a turn, at least along the long sides 48 of the coil 45. Accordingly, as the coils 45 are slid onto the stator poles 28, the individual electrically conductive wires 46 may move to fill relatively tightly in the stator slot 35. This movement may result in a number of openings or gaps between adjacent turns of the group of wires being filled due to the lateral movement of the electrically conductive wires 46.

As stated above, because of the relatively loose twist of the electrically conductive wires 46, the electrically conductive wires 46 may move laterally as each coil 45 is mounted on its stator pole 28 (and/or even before mounting). The electrically conductive wires 46 along the long sides 48 of the coil 45 may move laterally within the stator slot 35 to reduce the number and size of the openings between previously a wound group or groups electrically conductive wires 46 from a prior turn or turns. In some instances, the portion of the electrically conductive wires 46 along the short sides 49 of each coil 45 may move so as to relatively reduce or eliminate the twist of the electrically conductive wires 46 along the short sides 49. As such, as noted above, according to one or more embodiments, each turn of the group of electrically conductive wires 46 may still be twisted, but the twisted portion may tend to be concentrated in a portion of the turn along the long sides 48 of the coil 45. Thus, according to one or more embodiments, while the electrically conductive wires 46 may be relatively consistently twisted at least in terms of the amount of twist as the coil 45 is formed, the twist may not be consistent along the length of each turn, i.e., one turn rotation of the coil 45. Thus, each twist and subsequent counter twist may provide a relatively lesser number of twists per side (e.g., each 2.5 twists per side or half turn) as compared to a situation where both long sides are twisted in a same direction (e.g., both five twists per side).

As may be seen in FIG. 6, interstices or uniform voids between adjacent turns of the group of wires along the cross-section through the stator slot 35 may be reduced or even generally eliminated. In other words, because of the relatively loose twist of the individual electrically conductive wires 46 of the group, the electrically conductive wires 46 may move laterally so that the individual electrically conductive wires 46 appear to be generally randomly placed and the outline or boundary of each turn or wrap of the group of electrically conductive wires 46 may be substantially eliminated. For example, in FIG. 7, a third turn 60 of the group of electrically conductive wires 46 is depicted with a somewhat circular cross-section or boundary. A fourth turn 61 of the group of electrically conductive wires 46 is depicted with a somewhat rectangular cross-section. A second turn 62 of the group of electrically conductive wires 46 and a first turn 63 of the group of electrically conductive wires 46 each can have a generally different cross-section, such as shown in FIG. 7. As such, even though the group of electrically conductive wires 46 may have initially had a generally circular-cross section upon the twisting, upon positioning the coil 45 within the stator slot 35, the electrically conductive wires 46 within many or even all of the turns of the group of electrically conductive wires 46 may be shifted to have non-circular cross-sections. In this example, the electrically conductive wires 46 of each individual turn (including the first through third fourth turns 60-63) for this section of the coil 45 can be twisted together either according to a clockwise twisting direction or a counterclockwise twisting direction as discussed above, which can be the opposite twisting direction of the opposite second portion 52 of the same coil 45.

Referring again to FIG. 6, the retention structure 55, such as a generally non-conductive board-like member, may span the opposed side edges 37 of the stator slots 35 generally adjacent and across the opening 39 to retain the coils 45 positioned on each stator pole 28 within the stator slots 35. (It should be noted that retention structure 55 is not depicted in FIG. 4 for clarity but can extend between the stator poles 28 and across each stator slot 35 as depicted in FIG. 6.).

With the disclosed structure, a relatively dense coil configuration (i.e., a reduced amount of air) may be created. The first portion 51 of each coil 45 may generally fill one stator slot 35 between the side surface 32 of one stator pole 28 and the centerline 40 of the stator slot 35 along a first path generally from the outer surface 36 of the stator slot 35 to the inner boundary 38 of the stator slot. Similarly, the second portion 52 of the same coil 45 may generally fill the stator slot 35 on the opposite side of the stator pole 28 between the opposite side of the stator pole 28 and the centerline 40 of its stator slot 35 along a second path generally from the outer surface 36 towards the inner boundary 38 of the stator slot 35. Upon positioning each coil 45 around a corresponding one of the stator poles 28, each stator slot 35 can have the first portion 51 of one coil 45 and the second portion 52 of an adjacent coil 45 positioned therein, as noted above. The non-conductive spacer 56 may be positioned between the first portion 51 of one coil 45 and the second portion 52 of a second, adjacent coil. Additionally, the first portion 51 and second portion 52 may be retained within the stator slot 35 by the retention structure 55.

INDUSTRIAL APPLICABILITY

As noted above, the present disclosure relates to electric motors, and more particularly to twisted coil structures for electric motors, and systems, components, assemblies, and methods thereof.

The industrial applicability of the rotary electric machine described herein will be readily appreciated from the foregoing discussion. The foregoing discussion can be applicable to rotary electric machines 25 such as switched reluctance motors in which it may be desirable to increase the electrical efficiency and performance of the rotary electric machine 25 over a range of operating conditions.

Through the disclosed rotary electric machine configuration and the method of fabricating a stator assembly, improved electrical performance, efficiency, and/or decreased copper losses may be achieved. For example, the rotary electric machine 25 in the form of a switched reluctance motor using the coil 45 depicted herein may reduce copper losses in the motor. For example, losses due to skin effects of the conductors may be reduced due to the relatively small diameter of the electrically conductive wires 46 as compared to the operating frequency of the rotary electric machine 25 in the form of the switched reluctance motor. In addition, the relatively small diameter of the electrically conductive wires 46 can also reduce eddy currents within the conductors. Still further, the higher density of copper within the stator slot 35 (e.g., as depicted in FIG. 6) also may improve the thermal conductivity by reducing the air gaps between the individual electrically conductive wires 46 of the group of electrically conductive wires 46.

Proximity effects can also be reduced through the disclosed structure by the relatively random positioning of the individual electrically conductive wires 46 within the group of twisted electrically conductive wires 46. This can be in part due to the relatively loose twists of the electrically conductive wires 46 and the lateral movement of the electrically conductive wires 46 as they are positioned within stator slot 35. Inter-strand circulation currents can be reduced by the disclosed structure due to the relatively random positioning of the individual electrically conductive wires 46 of the group of twisted electrically conductive wires 46 within the stator slot 35. For example, electrically conductive wires 46 of the coil 45 that are closer to the rotor poles 29 may experience a difference of induced voltage as compared to electrically conductive wires 46 that are farther away from the rotor pole 29. By twisting the individual electrically conductive wires 46 as they are wound about the central opening 47, the conductors can change position within each turn of the group of electrically conductive wires 46 which can result in generally averaging of the distance of the individual electrically conductive wires 46 of the wound group from the rotor poles 29. As a result, the voltage induced in each of the electrically conductive wires 46 through the rotor poles 29 can be generally averaged, which can reduce the inter-strand circulation caused by exposure of the individual electrically conductive wires 46 to different induced voltages.

The relatively loose twisting of the electrically conductive wires 46 within the group of wires can result in efficient volume utilization or packing of the electrically conductive wires 46 within the stator slots 35, such as shown in FIG. 6. If the individual electrically conductive wires 46 of the group are tightly twisted, the tightly twisted wires may form a relatively large, somewhat rigid generally circular structure. In this configuration, as coil 45 is slid onto its stator pole 28, relatively large air gaps may exist between adjacent turns of the group of electrically conductive wires 46. On the other hand, by relatively loosely twisting of the electrically conductive wires 46 the individual wires can be able to move laterally relative to each other as the coil 45 is slid onto its respective stator pole 28 and thus the individual electrically conductive wires 46 may more efficiently fill the stator slots 35. Through such a structure, a greater volume of the conductor (e.g., copper wire) may be positioned within the stator slots 35. This higher density of the conductor can result in a lower resistance through the coil 45 and, for a given voltage, a higher current carrying capacity and thus a more efficient operation of the rotary electric machine 25 in the form of the switched reluctance motor (and other rotatory machines according to embodiments of the disclosed subject matter).

As noted above, the twisting of the electrically conductive wires 46 may be according to a predetermined pattern. The twisting of the individual strands of electrically conductive wires 46 can be to form the electrically conductive wires 46 into a loosely formed rope structure. Such twisting can be to achieve a net twist per unit length. This relationship can be controlled to achieve a net twist per turn at the coil level. Shorter length coils may require a higher twist per unit length then longer coils.

Notably, according to embodiments of the disclosed subject matter, the twisting may be done in opposite directions (from a same reference point or frame of reference). In particular, according to embodiments of the disclosed subject matter, the grouped electrically conductive wires 46 may be twisted in a first direction for one or more portions or segments of a turn (in this context a single revolution) around the coil 45 and in a second direction opposite the first direction for one or more portions or segments of the same turn around the coil 45. Such first and second directions may be referred to herein as clockwise and counterclockwise or vice versa, respectively.

In some embodiments, the grouped electrically conductive wires 46 either may not be twisted for one or more portions or segments of the turn around the coil 45 (this may be referred to as neutral or untwisted positioning) or may be twisted by an amount less than (i.e., between) the amounts of twist for first and second directions for so-called twisted portions or segments around the coil 45. For instance, clockwise and counterclockwise twisting may be characterized as a twist of +/−360 degrees or more (e.g., +/−720 degrees or +/−900 degrees) from a neutral or zero position, that is, one twisting revolution, two twisting revolutions, or 2.5 twisting revolutions. Hence, untwisted may be characterized as at the neutral or zero degrees position for the electrically conductive wires 46 of the group or even between positive three hundred sixty degrees and negative three hundred sixty degrees, such as positive five degrees. In that the electrically conductive wires 46 of the group can be twisted together at least one full twist revolution, i.e., three hundred sixty degrees or more (e.g., 360 degrees to 900 degrees), each electrically conductive wire 46 can have at least one portion or segment along the turn that is closer to the central opening 47 (and the center void) than corresponding portions or segments of the other electrically conductive wires 46 of the group and at least one portion or segment along the turn that is farther from the central opening 47 (and the center void) than corresponding portions or segments of the other electrically conductive wires 46 of the twisted group.

As noted above, the twisting can be to one or more portions or segments of the turn. For instance, according to one or more embodiments, the segment of the electrically conductive wires 46 at one of the long side 48, for instance, associated with the first portion 51 of the coil 45, can have electrically conductive wires 46 of the group that are twisted together in a clockwise twisting direction, whereas the segment of the electrically conductive wires 46 at the other long side 48, for instance, associated with the second portion 52 of the coil 45, can have electrically conductive wires 46 of the group that are twisted together in a counterclockwise direction. The segments at the short sides 49 may be either untwisted or twisted together in a same twisting direction as an immediately preceding long side 48. In this example, the twisting together for the long sides 48 can be continuous along an entire length or an entirety of the long sides 48. Thus, the twisting together of the electrically conductive wires 46 of the group along each of the long sides 48 can be considered or characterized as being continuously twisted together without any untwisted portion(s) along the entire long side 48. The number of twists for the long sides 48 can be the same according to embodiments of the disclosed subject matter. Optionally, the twisting together of the electrically conductive wires 46 at the short sides 49 can be less than the twisting together of the electrically conductive wires 46 for the long sides 48. That is, the twisting together of the electrically conductive wires 46 at the short sides 49 can be less tight than the twisting together of the electrically conductive wires 46 for the long sides 48.

According to one or more embodiments, the twisting together of the electrically conductive wires 46 per portion or segment may be the same or substantially the same (e.g., same amount of twisting) in a thickness direction or at a same level of the coil 45 for the different turns of the group of electrically conductive wires 46 generally at the same level (i.e., into the page direction in FIG. 4; horizontal direction in FIG. 7, where first turn 63 and second turn 62 of the group of electrically conductive wires 46 may be considered to be at a same level of buildup of the coil 45). However, the twisting together (or not) of the group of electrically conductive wires 46 may change in a height direction of the coil 45 (i.e., horizontal direction in FIG. 4; vertical direction in FIG. 7, where third turn 60 may be considered to be at a height or level above second turn 62 of the group of electrically conductive wires 46 in the buildup of the coil 45). For instance, the twisting together amount for the electrically conductive wires 46 may increase as the turns increases and the buildup of the coil 45 grows. That is, at greater heights or levels the electrically conductive wires 46 may be twisted together more than the turns of the electrically conductive wires 46 closer to the central opening 47. Optionally, no twisting may occur for turns at the interface with the central opening 47. The height direction or levels of the coil 45 may be referred to herein as a direction away from the central opening (and the center void).

The electrically conductive wires 46 may be twisted together in a first direction for some of the turn, i.e., a single revolution of the rotating mechanism 70, and twisted together in a second direction for some of the same turn. For instance, the electrically conductive wires 46 may be twisted together in a counterclockwise twisting direction for at least one long side 48 of the coil 45 and twisted together in a clockwise twisting direction for another long side 48 of the coil 45.

Once the electrically conductive wires 46 have been wound or wrapped about the fixture a desired number of times, the electrically conductive wires 46 of the coil 45 may be secured together such as by tape 57 and the coil 45 removed from the fixture. Coils 45 of this type are sometimes referred to as concentrated coils as the windings form a multi-turn coil having the same magnetic axis and are fixed around a single stator pole 28.

The stator 26 may be formed by stacking a plurality of one-piece continuous annular iron members (not shown) together. A layer of insulative material (not shown) may be provided between each iron member. The coils 45 may be mounted on the stator 26 by moving the coils relative to the stator to slide a stator pole 28 through the central opening 47 of each coil 45. While sliding the coils 45 onto each stator pole 28, at least a portion of at least some of the electrically conductive wires 46 of each turn may move laterally relative to other electrically conductive wires 46 of the same turn. In one embodiment, the portions of the electrically conductive wires 46 being laterally moved are positioned along the major sides 48 of the coil 45. This configuration can generally minimize or eliminate interstices or uniform voids between adjacent turns of the group of wires along a cross-section of each coil 45 across each stator slot 35. It should be noted that the coils 45 may be initially formed with a generally symmetrical cross-section and the lateral movement of at least some of the electrically conductive wires 46 of each turn while mounting the coils 45 on the stator poles 28 may modify the shape of the coil to form a generally asymmetrical cross-section across a portion thereof. The asymmetrical cross-section may extend across a portion of a pair of adjacent stator slots 35 that are separated by a stator pole 28.

The coils 45 may be secured within the stator slots 35 such as by inserting a retention structure 55 that may span the opposed side edges 37 of the stator slots generally adjacent and across the opening 39. Coils 45 mounted on opposite stator poles 28 may be electrically connected to form opposed coil pairs. The windings of such opposed coil pairs may be electrically connected in parallel or series as part of an electrical circuit as desired.

While aspects of the present disclosure have been particularly shown and described with reference to the embodiments above, it will be understood by those skilled in the art that various additional embodiments may be contemplated by the modification of the disclosed machines, assemblies, systems, and methods without departing from the spirit and scope of what is disclosed. Such embodiments should be understood to fall within the scope of the present disclosure as determined based upon the claims and any equivalents thereof.

The invention claimed is:

1. A switched reluctance motor comprising:
a stator including a plurality of stator poles and a plurality of stator slots, each said stator slot being positioned between a pair of the plurality of stator poles;
a rotor positioned within the stator; and
a plurality of coils, each said coil being positioned around a corresponding one of the stator poles,
wherein each said coil is comprised of a plurality of electrically conductive wires and forms an elongate ring with a pair of opposing long sides and opposing short sides connecting the long sides,
wherein, for each said coil, the electrically conductive wires are arranged in a plurality of groups,
wherein, for each of the groups, the electrically conductive wires on a first long side of the pair of opposing long sides are twisted together in a clockwise twisting direction, as viewed from a first of the short sides, continuously along an entire length of the first long side, and
wherein, for each of the groups, the electrically conductive wires on a second long side of the pair of opposing long sides are twisted together in a counterclockwise twisting direction, as viewed from a second of the short sides, continuously along an entire length of the second long side.

2. The switched reluctance motor according to claim 1, wherein, for each of the first long side and the second long side, each of the groups of electrically conductive wires is twisted such that each electrically conductive wire has a plurality of portions closest to a center void of the coil and a plurality of portions farthest from the center void.

3. The switched reluctance motor according to claim 1, wherein each of the groups of electrically conductive wires is twisted such that the twisting at the short sides of the coil is less tight than the twisting at the first and second long sides of the coil.

4. The switched reluctance motor according to claim 1, wherein one of the first long sides of a first one of the coils is provided with one of the second long sides of a second one of the coils in a same stator slot of the plurality of stator slots such that the electrically conductive wires twisted together in the clockwise twisting direction are adjacent the electrically conductive wires twisted together in the counterclockwise twisting direction.

5. The switched reluctance motor according to claim 1, wherein the elongate ring is in the form of an oval or a rectangular oval.

6. The switched reluctance motor according to claim 1, wherein, for each said coil, for each said group of electrically conductive wires, the electrically conductive wires on the short sides are untwisted.

7. The switched reluctance motor according to claim 1, wherein each of the coils is set with bonding resin.

8. The switched reluctance motor according to claim 1,
wherein a number of the electrically conductive wires for each of groups is a same number in a range of 2 to 30 inclusive, and/or
wherein a total number of turns for each of the coils is in a range of 10 to 100 turns inclusive.

9. The switched reluctance motor according to claim 1, wherein the groups of the electrically conductive wires are twisted according to a greater number of twists as a number turns of the coil increases.

10. An electric motor comprising:
a stator;
a rotor positioned relative to the stator; and
a plurality of coils respectively arranged around stator poles of the stator,
wherein each said coil is comprised of a plurality of electrically conductive wires wound continuously to form a predetermined geometrical shape, and
wherein for at least one of the coils:
turns of the electrically conductive wires on a first side of the predetermined geometric shape are twisted together in a first direction when viewed from a first side of the predetermined geometric shape, and
turns of the electrically conductive wires on a second side of the predetermined geometric shape opposite the first side are twisted together in a second direction opposite the first direction when viewed from a second side of the predetermined geometric shape opposite the first side of the predetermined geometric shape.

11. The electric motor according to claim 10, wherein the turns of the electrically conductive wires are continuously twisted along an entire length of the first side and the second side such that the twisting is at least 360 degrees along the entire length of the first side and the second side.

12. The electric motor according to claim 10, wherein the turns of electrically conductive wires for said at least one coil are twisted such that each electrically conductive wire has at least one portion closest to a center void of the coil and at least one portion farthest from the center void.

13. The electric motor according to claim 10,
wherein a number of the electrically conductive wires per turn around the first side and the second side is a same number in a range of 2 to 30 inclusive, and
wherein a total number of the turns for each of the coils is in a range of 10 to 100 turns inclusive.

14. The electric motor according to claim 10, wherein for each said at least one coil the electrically conductive wires on sides between the first and second sides are twisted less than the twisting along each of the first side and the second side.

15. The electric motor according to claim 10,
wherein the first groups of the electrically conductive wires are twisted in the clockwise direction a greater number of twists in a direction away from a center void portion of the coil, and
wherein the second groups of the electrically conductive wires are twisted in the counterclockwise direction a greater number of twists in the direction away from a center void portion of the coil.

16. A coil winding for an electric motor comprising:
turns of a predetermined number of electrically conductive wires on a first side of the coil winding twisted together in a clockwise direction as viewed from a third side of the coil winding; and
turns of the predetermined number of the electrically conductive wires on a second side of the coil winding opposite the first side twisted together in a counterclockwise direction as viewed from a fourth side of the coil winding opposite the third side of the coil winding.

17. The coil winding according to claim 16, wherein the turns of the electrically conductive wires are continuously twisted along an entire length of the first side and the second side such that the twisting is by 180 to 900 degrees along the entire length of each of the first side and the second side.

18. The coil winding according to claim 16, wherein one or more segments of the electrically conductive wires are not twisted together.

19. The coil winding according to claim 16, wherein each of the first and second turns of electrically conductive wires is twisted such that each electrically conductive wire has a plurality of portions closest to a center void of the coil winding and a plurality of portions farthest from the center void of the coil winding.

20. The coil winding according to claim 16, wherein the electrically conductive wires are twisted such that the twisting at opposing sides of the coil winding between the first and second sides is less tight than the twisting at the first and second sides of the coil winding.

* * * * *